United States Patent Office
3,704,098
Patented Nov. 28, 1972

3,704,098
COLORIMETRIC INDICATOR SOLUTION FOR THE DETECTION OF NITROGEN DIOXIDE AND METHOD OF ANALYSIS
Avery B. Smith, Wallingford, Ralph R. Hennig, Cos Cob, Abraham J. Kurtz, Norwalk, and Gregory Pantchenko, Westport, Conn., assignors to Resource Control, Inc.
No Drawing. Filed June 22, 1970, Ser. No. 48,491
Int. Cl. G01n 21/12
U.S. Cl. 23—232 R                    6 Claims

ABSTRACT OF THE DISCLOSURE

Soluble tablets suitable for providing an indicator solution of the colorimetric type for quantitatively measuring the nitrogen dioxide contamination in an atmosphere are disclosed. The indicator solution, which has a pH of not more than 4.0, is conveniently prepared by dissolving a tablet containing a diazotizing agent mechanically supported in a suitable manner and a second tablet containing a coupling agent also mechanically supported in a suitable manner in a predetermined amount of water. A measured solution is transferred to an absorption bubbler of the type customarily employed in colorimetric analysis, the reagent solution is exposed to metered quantities of air containing nitrogen dioxide as a contaminant thus resulting in the formation of red-violet diazo dye. On examination of the sample thus exposed in a colorimeter, the nitrogen dioxide content is readily measured.

This invention relates to the detection of nitrogen dioxide in an atmosphere. More particularly, this invention relates to an improved colorimetric reagent suitable for tht analysis of nitrogen dioxide in air and to soluble tablets useful for conveniently preparing the said reagent. The subject colorimetric reagent is formed by dissolving in water to a predetermined volume a soluble pellet or tablet containing a diazotizing agent and a second soluble pellet or tablet containing a coupling agent. Both of the tablets contain, in addition to the active ingredients supportative materials which also provide for adjusting the acidity and for loss of dissolution. This invention is further concerned with the provision of providing the necessary reagents for field operations in remote locations or trailer-based ambient air surveys in which the use of the soluble tablets of this invention represents a major advance over the handling of bulky liquid solutions. Further the invention of this application relates to adaptation of the Saltzman procedure in which the need for precise and time consuming weighings, aliquotings, and colorimetric calibrations associated with the conventional Saltzman reagent preparation are completely eliminated.

The conventional laboratory procedure for determining the presence of nitrogen dioxide in an atmosphere is based on the use of the Saltzman reaction utilizing a reagent solution as the indicator means. Such reagent solutions function as detectors of nitrogen dioxide by the formation of an azo dye. In this reaction first a diazotization of an amine takes place and in a second step the resulting diazo compound is reacted with a coupling agent to form an azo dye with the consequence that the reagent assumes a red-violet color of relatively high intensity. The principal drawbacks to this procedure are that rather elaborate glass equipment is required and the reagent solution has only a limited stability and shelf life. The analysis, because of its complexity, must be performed by trained personnel and the apparatus used in the determination is not easily portable and could not conveniently be used in the field, nor could the analysis be performed with the rapidity desired on many occasions. The problems with the Saltzman procedure have been recognized and proposals advanced for overcoming them. Thus field use types of indicators for nitrogen dioxide have been proposed heretofore which permit tests to be made by personnel not trained in chemical analysis procedures. Those previously suggested have generally utilized a silica gel impregnated with a phenylbenzedine compound and a strong acid. An elongated column or bed of silica gel or other inert granular material carrying the reagent is disposed in a transparent tube, and the indicator material is held in place in the tube by end plugs of porous material, such as glass wool. The ends of the tube are sealed initially and when a test for the presence of nitrogen dioxide is to be made, the end seals are broken and the atmosphere caused to pass through the tube. This is accomplished by an aspirator bulb or other pump mechanism. The presence of nitrogen dioxide is indicated by a blue color change occurring in the impregnated granular material.

Although this arrangement represents a much less complicated test device than that required in following the Saltzman or similar laboratory procedure, it still is not convenient where a large number of tests are to be made. Furthermore, there are storage problems which limit the shelf life of a prepared indicator, with the result that the indicator components must generally be packaged separately and then admixed and placed in the tube shortly before actual use. This is not convenient or practical in many cases.

It is accordingly the general objective of the present invention to provide a Saltzman reagent preparative method which comprises two standarized, pre-calibrated tablets. The use of such tablets, one of which contains the diazotizing agent, and the other which contains the coupling agent provides a highly convenient method for preparing the otherwise complicated Saltzman reagent quickly and accurately in the field.

The active ingredients normally employed in the Saltzman reagent are sulfanilic acid or sulfanilamide which are utilized as diazotizing agents and ethylenediamine dihydrochloride or acetate which are generally employed as coupling agents. Since these active ingredients are light sensitive and, when mixed, highly reactive, it is necessary that they be enclosed in air-tight and light-tight containers and that they be separately tableted, being brought into contact in solution only shortly before being used. It has been discovered that the diazotizing agent together with supportative materials, which may also provide for adjustment of acidity and loss of dissolution, can be formulated as a pellet or tablet and that the coupling agent together with the required supportative materials which may also provide for adjustment of acidity and loss of dissolution of the tablet, in a like manner, can also be formed into a pellet or tablet and the required Saltzman reagent conveniently and quickly prepared by dissolving the soluble tablets together in water shortly before their use in detecting nitrogen dioxide.

Tablet A

Soluble tablet "A" comprises from about 0.10 to about 1.00 percent by weight of the coupling agent which can be N-(1-naphthyl)-ethylenediamine dihydrochloride or diacetate or mixture thereof with the balance being a supportive composition which, in addition, may also provide for the adjustment of the acidity and loss of dissolution of the tablet. Useful supportive compositions include those selected from the group consisting of citric acid, boric acid, maleic acid, malonic acid, succinic acid, tartaric acid, sodium dihydrogen phosphate, potassium dihydrogen phosphate, sugar, dextrin, gum arabic, fructose, starch, and mixtures thereof.

Tablet B

Tablet B comprises the diazotizing agent which can be sulfanilic acid, sulfaniliamide or mixtures thereof together with the appropriate supportive materials which may provide, in addition, for the adjustment of the acidity and the loss of dissolution of the tablet. Generally, Tablet B will comprise from about 25 to about 90 percent by weight of a material, selected from the group consisting of sulfanilic acid, sulfanilamide and mixtures thereof with the balance being a supportive material such as, for example, a material selected from the group consisting of boric acid, citric acid, sugar, dextrin, gum arabic, fructose, starch and mixtures thereof.

In preparing both tablet compositions A and B, it is sometimes desirable to add a suitable lubricant to the composition which can constitute from about 1 to about 10 percent by weight based on the total tablet weight of a material such as carboxymethyl cellulose, hydroxyethyl cellulose, hydroxypropyl cellulose, mixtures thereof, etc. These previously mentioned materials also act as binders in the preparation of the self-supporting pellets or tablets of this invention.

In tableting the compositions of this invention it is advantageous for the ingredients to have a range of particle size, suitably from about 30 mesh to about 200 mesh or finer. Tableting is accomplished in any one of the commercially available machines, suitably at pressures of from about 5000 to about 70,000 p.s.i. or higher. Although lower pressures can be employed, the result is generally a fragile tablet which will not adequately withstand ordinary handling and shipping. The tablets are suitably packaged in an envelope of a material impervious to light and air which can be, for example, aluminum foil, laminated plastic aluminum foil, etc. or the tablets are sealed between sheets of a suitable packaging material. Such packages are readily torn open and the contents placed in use.

In practice the one "A" tablet and one "B" tablet are dissolved in an appropriate and carefully measured amount of water to produce the absorption reagent of the Saltzman procedure having a pH of not more than 4.0 as outlined in Public Health Service Publication No. 999-AP-11. In the original Saltzman reagent the solution of sulfanilic acid was in glacial acetic acid. It has now been found that other, normally solid acids, such as citric, tartaric, boric, etc. will serve as well.

As previously pointed out, the absorption reagent prepared by dissolving an "A" tablet and a "B" tablet in a measured amount of water must have a pH of not more than 4.0 and consequently an acid adjusting supportive material or composition such as citric acid, boric acid, malonic acid, etc., must be present in at least one of the tablet compositions. This acid adjusting supportive material or composition may be added in Tablet A, in Tablet B or a portion may be added in Tablet A and another portion in Tablet B, as desired. This is further illustrated by the compositions set forth in Table 1.

Typical examples of the formulation of tablets "A" and "B" are given below in Table 1.

TABLE 1.—TABLET COMPOSITIONS

| Formulation | Tablet A Component | Tablet A Weight percent present | Tablet B Component | Tablet B Weight percent present |
|---|---|---|---|---|
| I | N-(1-naphthyl)-ethylenediamine dihydrochloride (NED). | 0.41 | Sulfanilic acid | 75 |
|   | Citric acid | 63.40 | Boric acid | 25 |
|   | Boric acid | 36.19 | | |
| II | NED | 0.40 | Sulfanilic acid | 75 |
|   | Maleic acid | 63.00 | Boric acid | 25 |
|   | Boric acid | 36.60 | | |
| III | NED | 1.96 | Sulfanilic acid | 50 |
|   | Sugar | 98.04 | Citric acid | 50 |
| IV | NED | 0.31 | Sulfanilic acid | 75 |
|   | Malonic acid | 63.30 | Boric acid | 25 |
|   | Boric acid | 36.39 | | |
| V | NED | 0.25 | Sulfanilic acid | 50 |
|   | Succinic acid | 60.00 | Citric acid | 50 |
|   | Boric acid | 39.75 | | |
| VI | NED | 0.24 | Sulfanilic acid | 75 |
|   | Tartaric acid | 55.00 | Citric acid | 25 |
|   | Boric acid | 44.76 | | |
| VII | NED | 0.24 | Sulfanilic acid | 50 |
|   | Sodium dihydrogen phosphate. | 40.40 | Boric acid | 50 |
|   | Boric acid | 59.36 | | |
| VIII | NED | 0.41 | Sulfanilic acid | 75 |
|   | Potassium dihydrogen phosphate. | 52.00 | Boric acid | 25 |
|   | Boric acid | 47.59 | | |

A typical test procedure for nitrogen dioxide using the novel tablet compositions of this invention is as follows:

One "A" tablet and one "B" tablet are removed from the enclosing foil packs and dissolved together in approximately 200 ml. of distilled water. The solution is transferred quantitatively to a 250 ml. volumetric flask and diluted accurately to the mark. This solution which has a pH of not more than 4.0, is the standard reagent solution of the Saltzman Procedure. An exactly measured portion of the solution is transferred to an absorption bubble of the type customarily employed in this service and the reagent solution is then exposed to properly metered quantities of air. The sample, upon completion of absorption, is examined at 550 m$\mu$ in a suitable spectrophotometer, such as a Bausch and Lomb Spectronic 20, using standard ½ inch cells. The corrected absorbance reading is now used together with a predetermined standardization factor, furnished with the tablets, to provide an analysis of the nitrogen dioxide in the atmosphere according to the formula:

$$\text{P.p.m. NO}_2 = \frac{(C_{abs})(M)}{V}$$

where $C_{abs}$ = Corrected absorbance
$M$ = Standardization factor
$V$ = Sample volume in liters at 25° C. and 760 mm. Hg In conducting analyses of the type described above if a different type spectrophotometer is employed or if cells of a different light path are used, the calibration curves must be redetermined.

In the colorimeter, such as the type mentioned above, the intensity of the color is determined by measuring the light transmitted through the colored solution by its effect on the photoelectric cell. Since such colorimeters and the operation thereof are well known to those skilled in the art, it is not believed that a further or more detailed description is needed for a complete understanding of this invention. If desired, the colorimeter can be connected by electrical leads to a first recorder which will record the signal of the colorimeter. The first recorder may be connected to a second recorder which converts the signal from the first recorder into p.p.m. of nitrogen dioxide. Recorders of the type described here are well known in the art and since the construction of such devices forms no part of this invention, it is not believed that additional explanation of their operation is needed.

What is claimed is:

1. A method of detecting and measuring nitrogen dioxide in a gas which comprises the steps of (A) contacting a predetermined volume of the gas with a measured amount of a reagent solution having a pH of not more than 4.0, the said reagent solution being prepared by dissolving in water (a) a first tablet comprising from about 0.10 to about 1.00 percent by weight of a compound selected from the group consisting of N-(1-naphthyl)-ethylenediamine dihydrochloride, N-(1-naphthyl)-ethylenediamine diacetate and mixtures thereof with the balance being a supportive material and (b) a second tablet comprising from about 25 to about 90 percent by weight of a material selected from the group consisting of sulfanilic acid, sulfanilamide, and mixtures thereof, with the balance being a supportative composition and (B) detecting a change in the color of the reagent solution after contacting the gas with the reagent solution by measuring the intensity of the color in a colorimeter wherein the intensity measurement is converted into nitrogen dioxide concentration in the gas.

2. The method of claim 1 wherein the said first tablet and the second tablet are individually packeted in containers impervious to light and air and prior to detecting nitrogen dioxide in a gas the said containers are opened and the tablets contained therein are utilized to prepare the said reagent solution.

3. The method of claim 1 wherein the supportive material of the said first tablet is selected from the group consisting of citric acid, boric acid, maleic acid, malonic acid, succinic acid, tartaric acid, sodium dhydrogen phosphate, potassium dihydrogen phosphate, sugar dextrin, gum, arabic, fructose, starch, and mixtures thereof and the supportative composition of said second tablet is selected from the group consisting of citric acid, boric acid, sugar, dextrin, gum arabic, fructose, starch and mixtures thereof.

4. The method of claim 1 where the said first tablet comprises about 0.41 percent by weight of N-(1-naphthyl)-ethylenediamine dihydrochloride, about 63.4 percent by weight of citric acid with the balance being boric acid, and the said second tablet comprises about 75 percent by weight of sulfanilic acid, with the balance being boric acid.

5. The method of claim 1 wherein the said first tablet comprises about 0.40 percent by weight of N-(1-naphthyl)-ethylenediamine dihydrochloride, about 63 percent by weight of maleic acid with the balance being boric acid and the said second tablet comprising about 75 percent by weight of sulfanilic acid with the balance being boric acid.

6. The method of claim 1 wherein the said first tablet comprises about 1.96 percent by weight of N-(1-naphthyl)-ethylenediamine dihydrochloride with the balance being sugar and the said second tablet comprises about 50 percent by weight of sulfanilic acid with the balance being citric acid.

References Cited

UNITED STATES PATENTS

| | | | |
|---|---|---|---|
| 3,375,079 | 3/1968 | Lyshkow | 23—232 |
| 3,512,937 | 6/1967 | Schulze | 23—232 R |
| 3,574,552 | 4/1971 | Rakowski | 23—232 R |

OTHER REFERENCES

Kislyak et al., Chemical Abstracts, vol. 62, 1965, 7222 C.

MORRIS O. WOLK, Primary Examiner

R. E. SERWIN, Assistant Examiner

U.S. Cl. X.R.

252—408